W. A. DUNLAP.
TABLE AND LIKE ARTICLE.
APPLICATION FILED MAY 27, 1912.
1,162,147.
Patented Nov. 30, 1915.
2 SHEETS—SHEET 1.
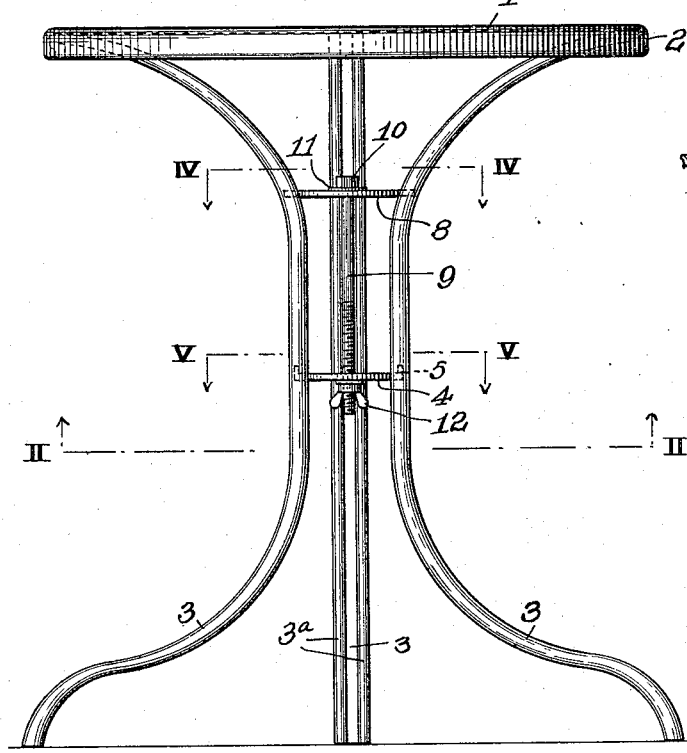
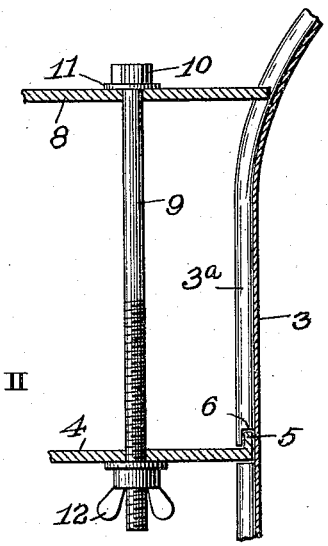
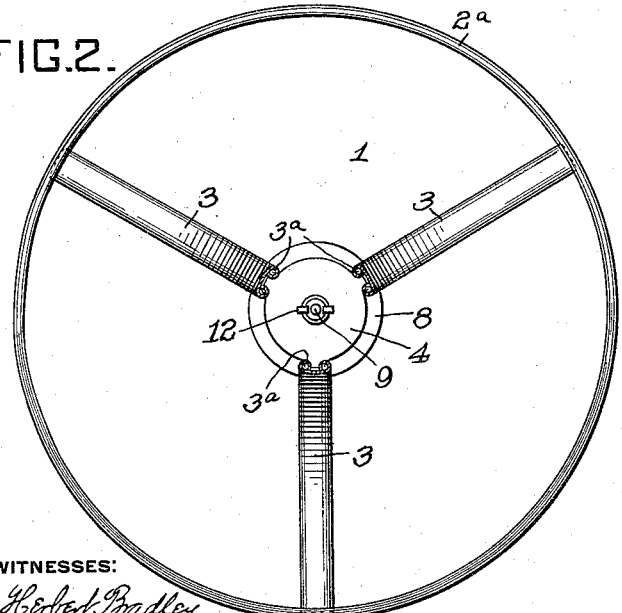
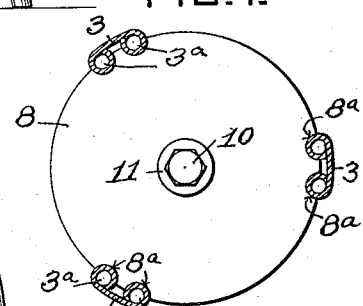
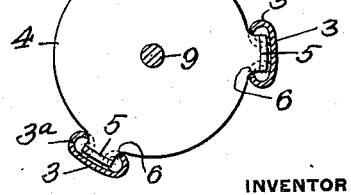
WITNESSES:
J. Herbert Bradley
Francis J Tomason
INVENTOR
William A. Dunlap
by Christy & Christy
Att'ys
COLUMBIA PLANOGRAPH CO., WASHINGTON, D. C.

W. A. DUNLAP.
TABLE AND LIKE ARTICLE.
APPLICATION FILED MAY 27, 1912.

1,162,147.

Patented Nov. 30, 1915.
2 SHEETS—SHEET 2.

WITNESSES:
J. Herbert Bradley.
Francis J. Tomasson.

INVENTOR
William A. Dunlap
by Christy & Christy
Atty's

UNITED STATES PATENT OFFICE.

WILLIAM A. DUNLAP, OF PITTSBURGH, PENNSYLVANIA.

TABLE AND LIKE ARTICLE.

1,162,147.  Specification of Letters Patent.  Patented Nov. 30, 1915.

Application filed May 27, 1912. Serial No. 699,898.

*To all whom it may concern:*

Be it known that I, WILLIAM A. DUNLAP, residing at Pittsburgh, in the county of Allegheny and State of Pennsylvania, a citizen of the United States, have invented or discovered certain new and useful Improvements in Tables and like Articles, of which improvements the following is a specification.

It is the object of the invention to provide a table, or similar article of furniture, composed of separable individual members, which may easily be assembled and rigidly secured together, and which may with equal facility be taken apart when desired. The several parts of the table are preferably formed of pressed metal, and they may be covered with a smooth, impervious coating of enamel, so that the table may be used with advantage where absolute cleanliness and sanitation are particularly desirable.

In the accompanying drawings there is shown a table embodying the invention.

Figure 6:
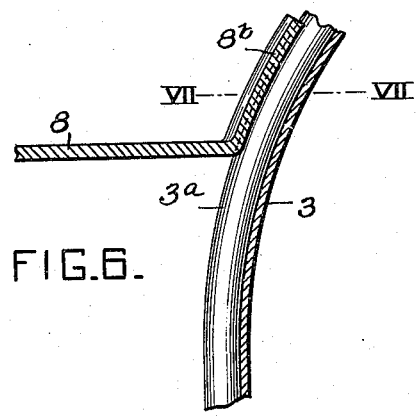
Figure 7:
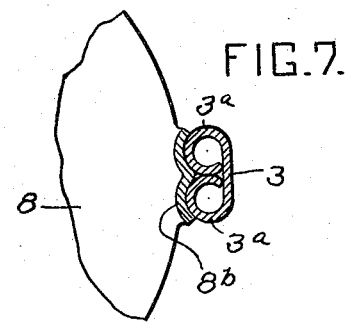
Figure 8:
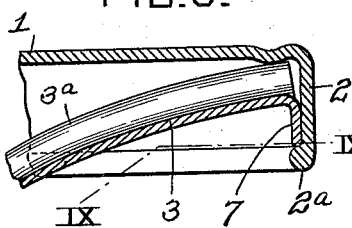
Figure 10:
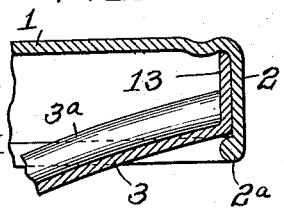
Figure 12:
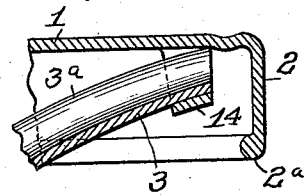
Figure 9:
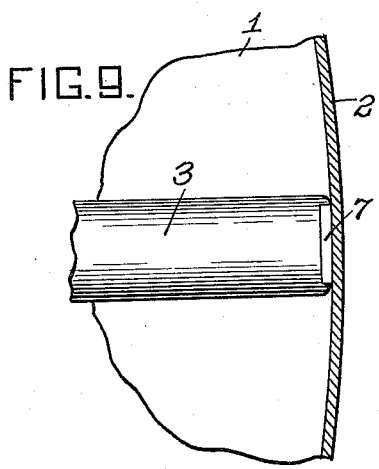
Figure 11:
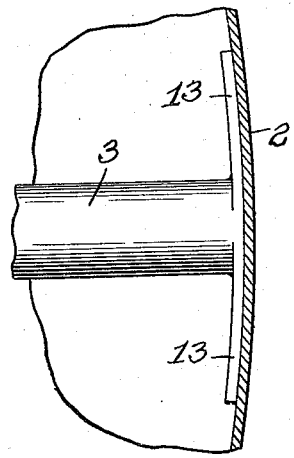
Figure 13:
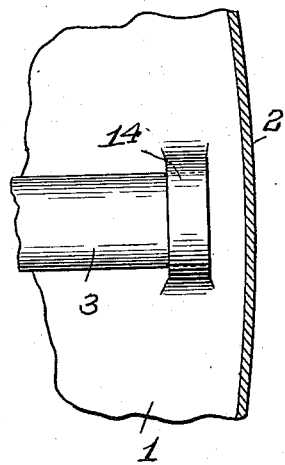

Figure 1 is a view of the assembled table in elevation. Fig. 2 is a sectional view, looking upwardly, on the line II—II of Fig. 1; Fig. 3 is a detail view on a somewhat larger scale; Fig. 4 is a sectional view, looking downwardly, on the line IV—IV of Fig. 1; Fig. 5 is a similar view on the line V—V of Fig. 1; Fig. 6 is a detail view, on a larger scale, showing a modification in the form of the locking-member; Fig. 7 is a horizontal section on the line VII—VII of Fig. 6; Fig. 8 is a detail view of the edge of the top-member and the end of one of the legs, as shown in Fig. 1; Fig. 9 is a view looking upwardly on the line IX—IX of Fig. 8; Figs. 10 and 11 are similar views showing a modification; Figs. 12 and 13 are similar views showing another modification.

The top 1 of the table is shown as formed of a single sheet of metal, having a depending rim 2, the lower edge $2^a$ of which may be bent or beaded inwardly to form a seat for the upper ends of the legs of the table. The legs 3 are formed of strips of metal having their upper and lower portions bent divergingly from their central portions, and for purposes of strength the opposite edges of the strips are bent to form beads $3^a$. In order to hold the legs in proper relation a spacing-member 4 is provided, which may be in the form of a disk as shown, having upwardly-bent lugs 5 detachably held in slots 6 cut in the beads $3^a$ of the legs 3. The upper ends of the legs 3 are adapted to bear against the inner face of the flange 2 of the top, and are shown as provided with lips 7 seated upon the beads $2^a$ on the edge of the flange. In order to hold the upper ends of the legs firmly against their seats in the top of the table, a locking-member is provided, which may be in the form of an adjustable disk 8 bearing against the upper curved portions of the legs 3 with a wedging action which forces the ends of the legs outwardly against the flange 2. The bearing portions of the disk 8 may be slotted, as shown at $8^a$, to fit the beads $3^a$ of the legs 3. Or the disk may be provided with upwardly extending wings $8^b$, shaped to fit the legs, as shown in Figs. 6 and 7. In order to adjust and hold the disk 8 in firm binding contact with the legs 3, a tension-member is provided, which is here shown as a bolt 9, passing through the disks 8 and 4. At its upper end this bolt is provided with a nut or head 10 and washer 11 bearing upon the upper face of the disk 8, and at its threaded lower end with a thumb-nut 12 adapted to bear against the under face of the disk 4. By turning the thumb-nut 12 the adjustable locking-member 8 may be drawn to a firm wedging engagement with legs 3, and will thereby spread and hold the upper ends of the legs in firm bearing upon their seats under the top 1.

In Figs. 10 and 11 there is shown a modified form for the upper ends of the legs, the end of the strip from which the leg is formed being widened and bent upwardly to form laterally projecting wings 13 nested between the bead $2^a$ and the flat top 1. This construction is of advantage in that it affords better resistance to torsional strain upon the legs.

In Figs. 12 and 13 the top-member is shown as provided with lugs 14 to receive the ends of the legs.

While I have herein shown and described one embodiment of my invention, it will be understood that the form and arrangement of the parts may be varied by those skilled in the art without departure from the substance of the invention as defined in the appended claims.

I claim as my invention:

1. An article of furniture comprising in combination, a metallic top member having peripherally arranged seats for the ends of supporting legs, and a plurality of detachable legs formed of strips of metal with beaded edges and having their upper portions bent outwardly, a spacing member arranged between and detachably secured to the legs, a locking member bearing upon the bent portions of the legs above the spacing member, and an adjustable connection between the locking member and the spacing member.

2. An article of furniture comprising in combination, a top member having a depending peripheral flange, a plurality of detached legs formed of strips of metal having their upper portions bent outwardly and provided at the ends of said upper portions with laterally projecting wings adapted to bear against the inner edge of said depending flange, a spacing member arranged between and detachably secured to the legs, and adjustable means for spreading the upper portions of the legs and holding their ends against said depending flange.

In testimony whereof I have hereunto set my hand.

WILLIAM A. DUNLAP.

Witnesses:
FRANCIS J. TOMASSON,
FRIEDA E. WOLFF.

Copies of this patent may be obtained for five cents each, by addressing the "Commissioner of Patents, Washington, D. C."